3,819,749
PHOSPHORIC ESTERS
Hans Urbach, 10 Am Weingarten, 6840 Lampertheim, Germany, and Heinrich Adolphi, 11 Kalmitweg, 6703 Limburgerhof, Germany
No Drawing. Filed Feb. 25, 1972, Ser. No. 229,560
Claims priority, application Germany, Mar. 1, 1971,
P 21 09 492.8
Int. Cl. A01n 9/36; C07f 9/08
U.S. Cl. 260—928                                2 Claims

ABSTRACT OF THE DISCLOSURE

Compounds, useful as pesticides, of the formula

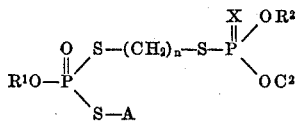

wherein:

$R^1$ and $R^2$ are alkyl of 1 to 4 carbon atoms; X is oxygen or sulfur;
$n$ is 0, 1, 2 or 3;
A is an optionally substituted alkyl, alkenyl, or alkynyl of 1 to 5 carbon atoms, or the radical

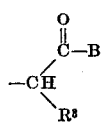

in which B is

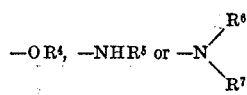

$R^4$, $R^5$, $R^6$ and $R^7$ being alkyl, alkenyl, or alkynyl of 1 to 4 carbon atoms or alkoxyalkyl, or $R^6$ and $R^7$, together with the nitrogen atom whose substituents they are, being a ring which may be substituted by hetero atoms, B further being the radical

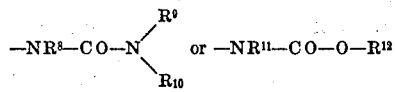

$R^8$, $R^9$, $R^{10}$, $R^{11}$ and $R^{12}$ being hydrogen or lower alkyl and in which $R^3$ is hydrogen, alkoxyalkyl of 2 to 6 carbon atoms or the radical

with D having the same meaning as B, or D and B together being the radical —$NR^{13}$—CO—$NR^{14}$, $R^{13}$ and $R^{14}$ being hydrogen or lower alkyl.

---

The present invention relates to new and valuable sulfur-containing phosphoric esters; agents containing these compounds for controlling pests, especially insects; and the use of the new compounds as pesticides.

It is known to use substituted phosphoric esters for controlling pests. However, their action is in many instances not satisfactory.

We have now found that sulfur-containing phosphoric esters of the formula

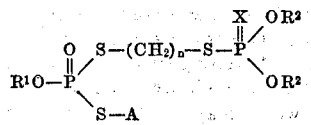

where $R^1$ and $R^2$ are identical or different and each denotes alkyl of 1 to 4 carbon atoms, X denotes sulfur or oxygen, $n$ denotes one of the integers 0, 1, 2 and 3, and A denotes optionally substituted alkyl, alkenyl or alkynyl of 1 to 5 carbon atoms, or the radical

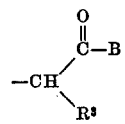

B denoting the radicals

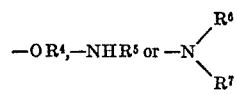

$R^4$, $R^5$, $R^6$ and $R^7$ each denoting alkyl, alkenyl or alkynyl of 1 to 4 carbon atoms or alkoxyalkyl, or $R^6$ and $R^7$, together with the nitrogen atom whose substituents they are, denoting a ring which may be substituted by hetero atoms, B further denoting the radical

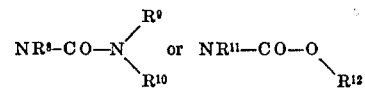

$R^8$, $R^9$, $R^{10}$, $R^{11}$ and $R^{12}$ denoting hydrogen or lower alkyl; $R^3$ denoting hydrogen, alkoxyalkyl of 2 to 6 carbon atoms or the radical

D having the same meanings as B, or D and B together denoting the radical $NR^{13}$—CO—$NR^{14}$, $R^{13}$ and $R^{14}$ denoting hydrogen or lower alkyl, have a good action on injurious insects, caterpillars and mites, e.g., aphids, houseflies, mosquitoes, cockroaches, animal lice, spinning mites and parasitic flies, in for instance vegetable, fruit and ornamental crops, and on pests in the veterinary and domestic sector.

Application may for instance be effected by bringing the insects into contact with the active ingredients, for example by spraying, dusting or otherwise treating the insects with the active ingredients, or by treating the plants, animals or structures to be protected against insect attack with the active ingredients.

The radical A may for instance have the following meanings:

—$CH_2$—$COOR^{15}$   $R^{15}$=methyl  —$CH_2$—$CH_2O$—$R^{15}$
                     ethyl  —$CH_2$—$CH_2$—S—$R^{15}$
                     allyl  —$CH_2$—C≡CH

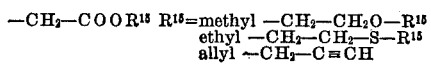

alkylmercaptoalkyl
haloalkyl
propyl, allyl, propargyl
—$CH_2$—$CH_2$—S—$C_2H_5$
—$CH_2$—$CH_2$—NH—CO—$CH_3$

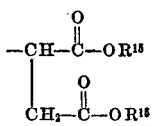, 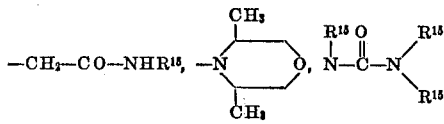

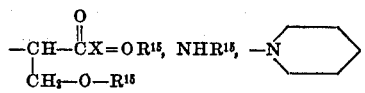

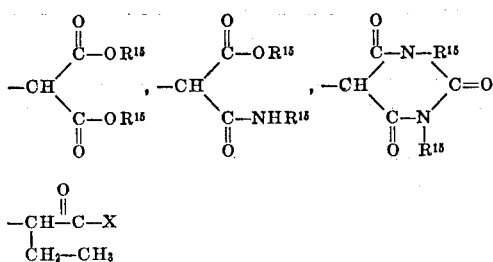

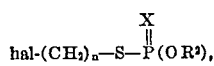

The new phosphoric esters may be prepared by various methods, e.g., by reacting salts of O-alkyl-S-carbalkoxy-alkyldithiophosphoric acids of the formula

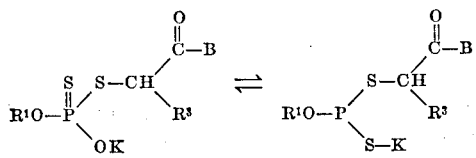

$R^1$, $R^3$ and B having the above meanings and K denoting a cation, with S-haloalkyl-O,O-dialkylthio (or dithio)-phosphoric esters of the formula $$\text{hal-}(CH_2)_n\text{—S—}\overset{\overset{X}{\|}}{P}(OR^2)_2,$$

hal denoting halogen, preferably chlorine or bromine, and X, $R^2$ and $n$ having the above meanings, in accordance with the following equation:

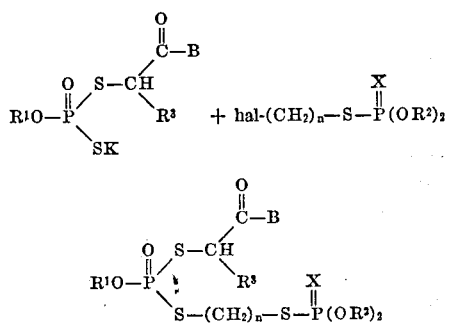

The yield in this reaction may be increased by a catalytic addition of sodium iodide.

The new phosphoric esters may also be synthesized by reacting S-methylol-O,O-dialkylthio (or dithio)-phosphoric esters with O,S-dialkyldithiophosphoric esters in accordance with the following equation:

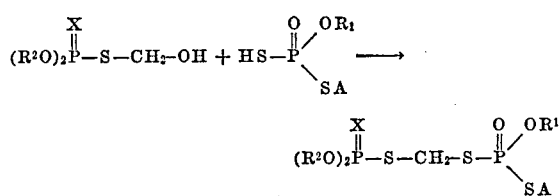

$R^1$, $R^2$, A and X having the above meanings.

Phosphoric esters according to the invention in which $n$ is 0 may for instance be prepared by joint oxidation of the solution of O,O-dialkyldithiophosphoric esters and O,S-dialkyldithiophosphoric esters in accordance with the equation

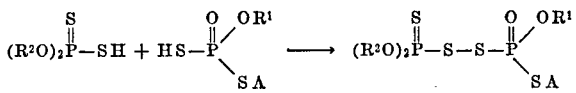

$R^1$, $R^2$ and A having the above meanings.

The following examples illustrate the preparation of the new phosphoric esters.

EXAMPLE 1

13.3 parts by weight of the compound of the formula

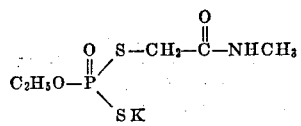

and 11.7 parts by weight of the compound of the formula

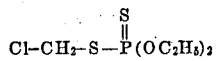

dissolved in 100 parts by volume of acetone are heated under reflux for 4 hours. The solution is subsequently cooled and filtered, the acetone is distilled off in vacuo, the residue is taken up in 100 parts by volume of chloroform, and the chloroform solution is washed separately with 100 parts by volume of 0.3% by weight sulfuric acid, 100 parts by volume of 0.3% by weight sodium bicarbonate solution and 100 parts by volume of pure water, dried with $Na_2SO_4$ and distilled in vacuo. The residue remaining at 1 mm. Hg and 60° C. amounts to 17 parts by weight, and is a yellowish oil of unpleasant smell.

$n_D^{26}$: 1.5229.

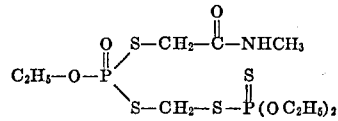

The following compounds may be prepared analogously:

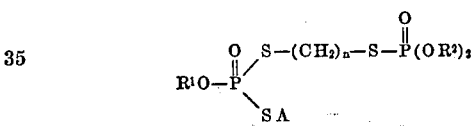

| No. | $R^1$ | $R^2$ | $n$ | X | A | Refractive index |
|---|---|---|---|---|---|---|
| 1 | CH₃ | C₂H₅ | 1 | S | —CH₂—CO—NHCH₃ | $n_D^{26}=1.5199$ |
| 2 | CH₃ | C₂H₅ | 1 | S | —CH₂—COOCH₃ | $n_D^{26}=1.5175$ |
| 3 | CH₃ | C₂H₅ | 1 | S | —CH₂—COOC₂H₅ | $n_D^{26}=1.5213$ |
| 4 | C₂H₅ | C₂H₅ | 1 | S | —CH₂—COOCH₃ | $n_D^{26}=1.5205$ |
| 5 | C₂H₅ | C₂ | 1 | S | —CH₂—CONHCH₃ | $n_D^{26}=1.5229$ |
| 6 | C₂H₅ | C₂H₅ | 1 | S | —CH₂—COOC₂H₅ | $n_D^{26}=1.5131$ |
| 7 | CH₃ | C₂H₅ | 1 | S | —CH(COOCH₃)₂ | $n_D^{23}=1.4944$ |
| 8 | CH₃ | C₂H₅ | 1 | S | —CH₂—C≡CH | $n_D^{23}=1.5293$ |
| 9 | CH₃ | C₂H₅ | 1 | S | —CH—COOC₂H₅<br>CH₂—COOC₂H₅ | $n_D^{24}=1.4782$ |
| 10 | CH₃ | C₂H₅ | 2 | O | —CH(COOCH₃)₂ | $n_D^{24}=1.4842$ |
| 11 | CH₃ | C₂H₅ | 2 | O | —CH₂—C≡CH | $n_D^{24}=1.5056$ |
| 12 | CH₃ | C₂H₅ | 1 | O | —CH(COOCH₃)₂ | $n_D^{21}=1.4740$ |
| 13 | CH₃ | C₂H₅ | 1 | O | —CH₂—C≡CH | $n_D^{21}=1.5057$ |
| 14 | CH₃ | CH₃ | 0 | O | —CH₂—CO—NHCH₃ | $n_D^{20}=1.5790$ |
| 15 | CH₃ | CH₃ | 0 | S | —CH₂—COOCH₃ | $n_D^{26}=1.5032$ |

The compounds according to the invention may be used as solutions, emulsions, suspensions or dusts. The form of application depends entirely on the purpose for which the compounds are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

EXAMPLE 2

80 parts by weight of compound 1 is mixed with 20 parts by weight of N-methyl-α-pyrrolidone. A mixture is obtained which is suitable for application in the form of very fine drops.

EXAMPLE 3

20 parts by weight of compound 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 4

20 parts by weight of compound 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of compound 4 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound 5 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 7

3 parts by weight of compound 6 is intimately mixed with 97 parts by weight of particulate kaolin. A dust is obtained containing 3% by weight of the active ingredient.

EXAMPLE 8

30 parts by weight of compound 7 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

For the biological experiments the following prior art active ingredients were used:

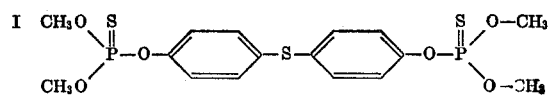

(Abate) U.S. Pat. 3,317,636; German Printed Application (DAS) 1,274,399.

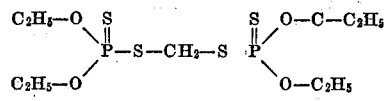

(Ethion) Belgian Pat. 559,258.

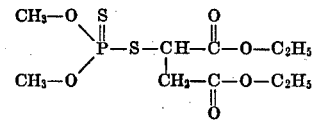

(Malathion).

EXAMPLE 9

Contact action on houseflies (*Musca domestica*)

Houseflies were subjected to carbon dioxide narcosis. A solution of the active ingredient was then trickled onto the abdomen of the narcotized animals. The action was assessed after 4 hours and the $LD_{50}$ calculated therefrom.

| Active ingredient | | $LD_{50}$, γ/fly | Toxicity index |
|---|---|---|---|
| I | Comparative agent | 2.5 | 32 |
| II | do | 0.7 | 114 |
| III | do | 0.8 | 100 |
| Number: | | | |
| 1 | According to invention | 0.2 | 400 |
| 2 | do | 0.29 | 275 |
| 4 | do | 0.27 | 295 |
| 5 | do | 0.19 | 420 |

EXAMPLE 10

Oral intake and contact action on caterpillars of the cabbage moth (*Plutella maculipennis*)

The caterpillars were placed on young cabbage leaves which had previously been dipped into an aqueous emulsion of the active ingredients.

The action was determined after 48 hours.

| Active ingredient | | Concentration in wt. percent | Mortality, percent |
|---|---|---|---|
| I | Comparative agent | 0.04 | 80 |
| I | do | 0.01 | Ineffective |
| III | do | 0.025 | 80 |
| III | do | 0.01 | Ineffective |
| Number: | | | |
| 2 | According to invention | 0.01 | 100 |
| 2 | do | 0.005 | 80 |
| 3 | do | 0.01 | 100 |
| 3 | do | 0.005 | 90 |
| 4 | do | 0.005 | 100 |
| 5 | do | 0.005 | 100 |
| 6 | do | 0.01 | 100 |
| 6 | do | 0.005 | 80 |

EXAMPLE 11

Action on bean aphids (*Aphis fabae*)

Bean plants suffering heavy attack from bean aphids were sprayed to runoff with an aqueous formulation of the active ingredients. The action was determined after 24 hours.

| Active ingredient | | Concentration of active ingredient (percent by weight) in aqueous emulsion | Mortality, percent |
|---|---|---|---|
| I | Comparative agent | 0.1 | Ineffective |
| II | do | 0.1 | 95 |
| II | do | 0.01 | Ineffective |
| III | do | 0.02 | 95 |
| III | do | 0.01 | Ineffective |
| Number: | | | |
| 4 | According to invention | 0.01 | 100 |
| 4 | do | 0.005 | 80 |
| 5 | do | 0.01 | 100 |
| 5 | do | 0.005 | 80 |

We claim:
1. A compound of the formula

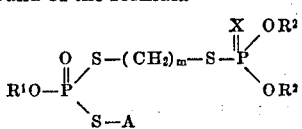

wherein:
$R^1$ and $R^2$ each denotes alkyl of 1 to 4 carbon atoms;
X is sulfur or oxygen;
n is one of the integers 0, 1, 2 or 3;
A is alkyl, alkenyl or alkynyl of 1 to 5 carbon atoms, or the radical

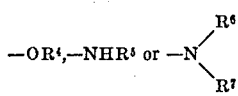

in which B is one of the radicals

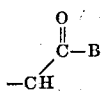

$-OR^4, -NHR^5$ or $-N\begin{smallmatrix}R^6\\R^7\end{smallmatrix}$ with $R^4$, $R^5$, $R^6$ and $R^7$ each being alkyl, alkenyl or alkynyl of 1 to 4 carbon atoms or alkoxyalkyl of 2 to 6 carbon atoms, B further denoting the radical

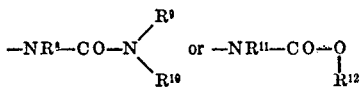

with $R^8$, $R^9$, $R^{10}$, $R^{11}$ and $R^{12}$ being hydrogen or lower alkyl, and in which $R^3$ is hydrogen, alkoxyalkyl of 2 to 6 carbon atoms or the radical

with D having the same meaning as B.
2. The compound of the formula

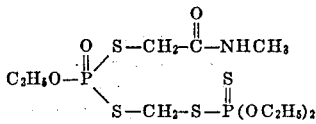

References Cited
UNITED STATES PATENTS

| | | | |
|---|---|---|---|
| 2,928,862 | 3/1960 | Willard et al. | 260—928 X |
| 2,992,264 | 7/1961 | Miller | 260—926 X |
| 3,092,649 | 6/1963 | Schrader | 260—928 X |

FOREIGN PATENTS

| | | | |
|---|---|---|---|
| 535,946 | 1/1957 | Canada | 260—928 |

LORRAINE A. WEINBERGER, Primary Examiner

R. L. RAYMOND, Assistant Examiner

U.S. Cl. X.R.

260—247.1, 257, 293.85, 926, 941, 942, 943, 956, 978, 979; 424—200, 204, 205

UNITED STATES PATENT OFFICE
CERTIFICATE OF CORRECTION

PATENT NO. : 3,819,749
DATED : June 25, 1974
INVENTOR(S) : Hans Urbach et al.

It is certified that error appears in the above-identified patent and that said Letters Patent are hereby corrected as shown below:

In Column 1, the formula in the Abstract delete "$...-S-P\genfrac{}{}{0pt}{}{X\quad OR^2}{OC^2}$" and substitute --$...-S-P\genfrac{}{}{0pt}{}{X\quad OR^2}{OR^2}$--

In Column 4, Under "$R^2$" in the table for compound 5, delete "$C_2$" and substitute --$C_2H_5$--

Signed and Sealed this twenty-second Day of June 1976

[SEAL]

Attest:

RUTH C. MASON
*Attesting Officer*

C. MARSHALL DANN
*Commissioner of Patents and Trademarks*